United States Patent
Paolone et al.

(10) Patent No.: US 6,679,426 B1
(45) Date of Patent: Jan. 20, 2004

(54) DEVICE FOR COUNTING BARS THAT ARE BEING TRANSLATED

(75) Inventors: Rolando Paolone, Buttrio (IT); Romano Cernotta, Povoletto (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 543 days.

(21) Appl. No.: 09/709,148

(22) Filed: Nov. 8, 2000

(30) Foreign Application Priority Data

Nov. 19, 1999 (IT) .......................................... MI99A2430

(51) Int. Cl.⁷ ................................................ G06F 7/08
(52) U.S. Cl. ....................................... 235/425; 356/634
(58) Field of Search ........................ 356/634; 235/425, 235/375; 198/453, 458, 424, 443, 418, 459.1; 209/536, 586

(56) References Cited

U.S. PATENT DOCUMENTS

| | | | | | |
|---|---|---|---|---|---|
| 4,094,129 A | * | 6/1978 | List | .................................. | 53/54 |
| 4,458,425 A | * | 7/1984 | Hester | .......................... | 33/296 |
| 4,660,712 A | * | 4/1987 | Braidotti et al. | ............. | 198/434 |
| 4,712,666 A | * | 12/1987 | Roseano | ....................... | 198/453 |
| 6,088,111 A | * | 7/2000 | Ciani et al. | .................. | 356/634 |
| 6,311,829 B1 | * | 11/2001 | Poloni et al. | ............. | 198/459.1 |
| 6,364,590 B1 | * | 4/2002 | Gayoso | ......................... | 412/18 |

* cited by examiner

*Primary Examiner*—Thien M. Le
(74) *Attorney, Agent, or Firm*—Abelman, Frayne & Schwab

(57) ABSTRACT

In a machine for counting bars, for example metal bars, that are to be sent on to a packaging station which packages a pre-set number of them in bundles, the problem of precise counting of the bars is solved by using, for the conveyance of the bars to the counting station, a screw conveyor, in which each groove of the screw has a wall having a pitch increasing more rapidly as compared to the normal pitch of the screw, thus making it possible, in the case where more than one bar is present in the same groove, to render the lying plane of the bars not parallel to the specific axis of the counting means. This is obtained by providing one of the faces of the grooves either with a special step having a continuously increasing width, or with a continuously increasing inclination.

7 Claims, 5 Drawing Sheets

DEVICE FOR COUNTING BARS THAT ARE BEING TRANSLATED

FIELD OF THE INVENTION

The present invention refers to a device for counting bars that are being translated and, more precisely, refers to a worm-screw device, or the like, which makes it possible to separate reliably even narrow bars while they are moving, transversely to their own longitudinal axis of symmetry, along a special path, so as to enable precise counting of the said bars.

STATE OF THE ART

In the handling of bars, for example metal bars, in particular to form bundles containing a given number of bars, generally automatic devices are used to count the bars while they move along a specific path.

Such devices comprise, for example, a screw conveyor, which displaces the bars transversely with respect to their longitudinal axis of symmetry and is combined with counting means, for instance photoelectric means. Said device further comprises means, coupled to means for rotating the worm screw, for detecting the number of rounds, and a processing unit which stores the information on the diameters of the bars and on the pitch of the screw of the screw conveyor used. At the entrance to the screw conveyor, the bars, which up to then have been moved together in a group, are separated from one another and accommodated in the grooves of the worm screw, theoretically one for each groove. The screw is positioned at a slightly inclined angle with respect to the plane of the conveyor set upstream and is structured in such a way that the pitch is constant and approximately equal to the diameter of the bar in the starting area of the screw itself. In the central region of the screw, the pitch starts increasing, thus enabling separation of the bars for the subsequent counting phase. In the final part of the screw, i.e., in the region where counting takes place, the pitch of the screw becomes constant again.

In the following, the pitch of a traditional screw measured in a generic point along its length will be defined as "normal pitch".

The bars thus advance perpendicularly to their longitudinal axis, with a distance between them that is at least equal to the pitch of the worm screw. A counting system, for example consisting of a photoelectric device with interruption of ray, is used to determine the number of bars in transit. In the ideal hypothesis that each groove accommodates a single bar, the number of interruptions of the ray corresponds to the number of bars that have passed through.

However, it is possible, in particular for bars of small diameter, for two bars to end up in a single groove. In this case, if the lying plane of the bars is not parallel to the axis of the counting system, the time of interruption of the ray will be greater than what it would be if a single bar passed, so enabling a processing unit to establish that in fact two bars to be counted, instead of just one. If, instead, the lying plane of the bars is more or less parallel to the axis of the counting system, the measured interruption time of the ray will be largely similar to the one of a single bar, and consequently the total count would be wrong. Since very often two bars are translated in the same groove, it is possible to have a grossly wrong final count, and consequently the bundles formed would contain a number of bars substantially higher than the one intended, with evident problems of a management and economic nature.

The present invention aims at overcoming such drawbacks by proposing a device which enables a precise counting of the bars, whatever the number of bars accommodated in a single groove may be.

SUMMARY OF THE INVENTION

According to the present invention, a worm-screw device is provided, in which the screw has a helical thread, with one or more starting points, which defines, in any given plane passing through the longitudinal axis of the screw itself, a plurality of grooves or grooves in which are accommodated the bars to be displaced, in a direction roughly perpendicular to the said longitudinal axis, towards counting means having a specific axis of action for the identification and counting of said bars; in the worm-screw device the screw presents grooves with at least part of one wall having a variable pitch which increases more rapidly than the normal pitch.

The presence of a part of the wall of the groove characterized by a pitch which increases more rapidly than the normal pitch makes it possible, in the case where more than one bar is present in the same groove, to render the lying plane of the bars not parallel to the specific axis of the counting means.

According to a first embodiment of the invention, this characteristic is obtained by generating grooves presenting, for at least part of the screw length, a wall which, towards the bottom, is characterized by a step having a width that increases in the direction of advance of the bars.

The width (measured in the direction of bar advance) of the step, measured in the vicinity of the counting means, preferably has a value of at least 0.3 times the diameter of the bar.

According to a second embodiment of the invention, this characteristic is obtained by generating grooves that present, for at least part of the screw length, a wall having a roughly rectilinear profile which forms an angle, with respect to the bottom of the groove, that increases in the direction of advance of the bars.

The angle of the wall with respect to the bottom of the groove, in the vicinity of the counting means, preferably has a value of at least 110°.

Again, in any case the height of the said grooves is preferably at least 0.3 times the diameter of the bars that are to be counted.

BRIEF DESCRIPTION OF THE DRAWINGS

The present invention will now be described in greater detail with reference to the annexed plates of drawings which represent, purely to provide non-limiting examples, possible embodiments of a machine for counting bars, which is equipped with a device according to the invention.

In the said plates of drawings.

DETAILED DESCRIPTION OF THE INVENTION

Figure 1A:
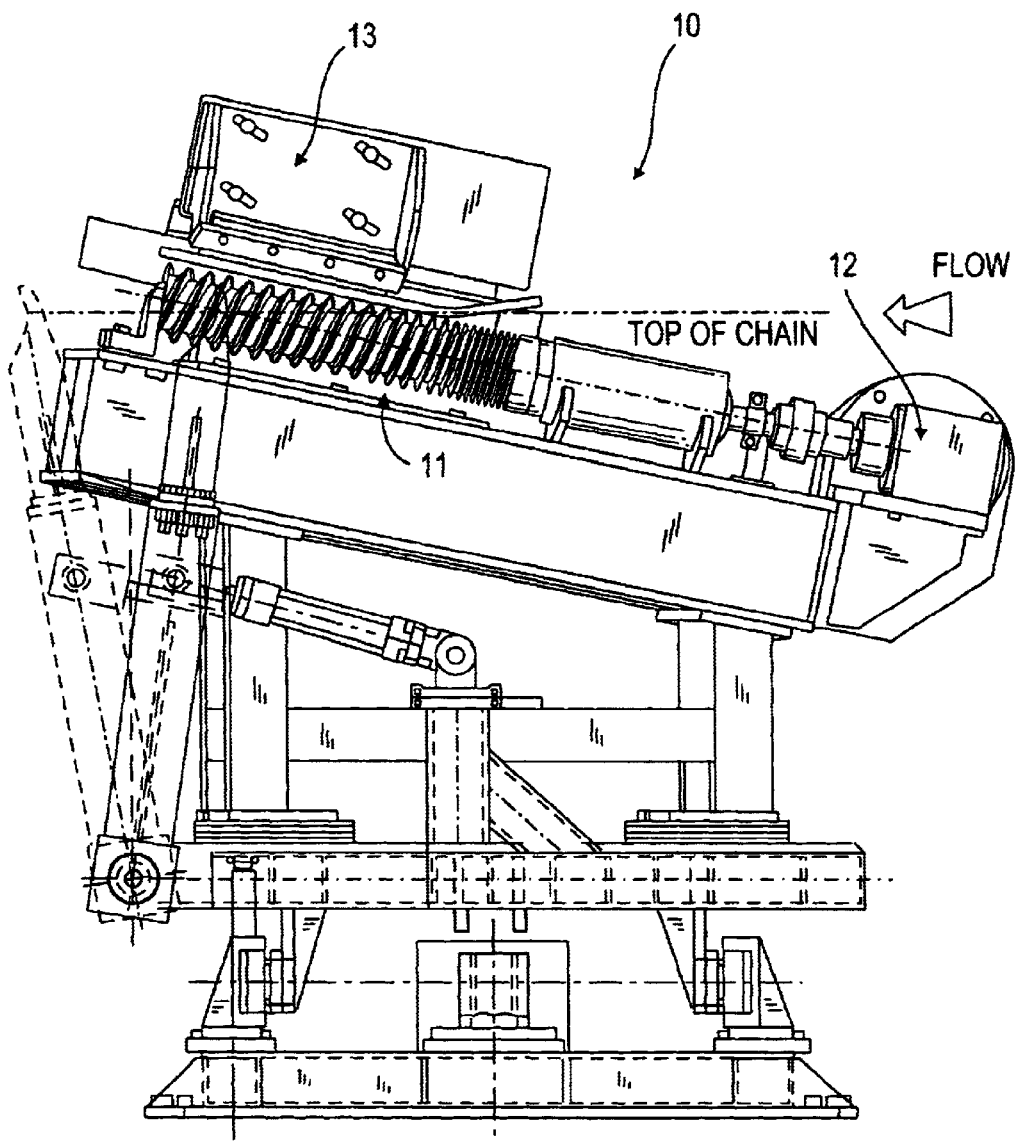
FIG. 1A represents a schematic side view of a machine which incorporates the device according to the invention.
Figure 1B:
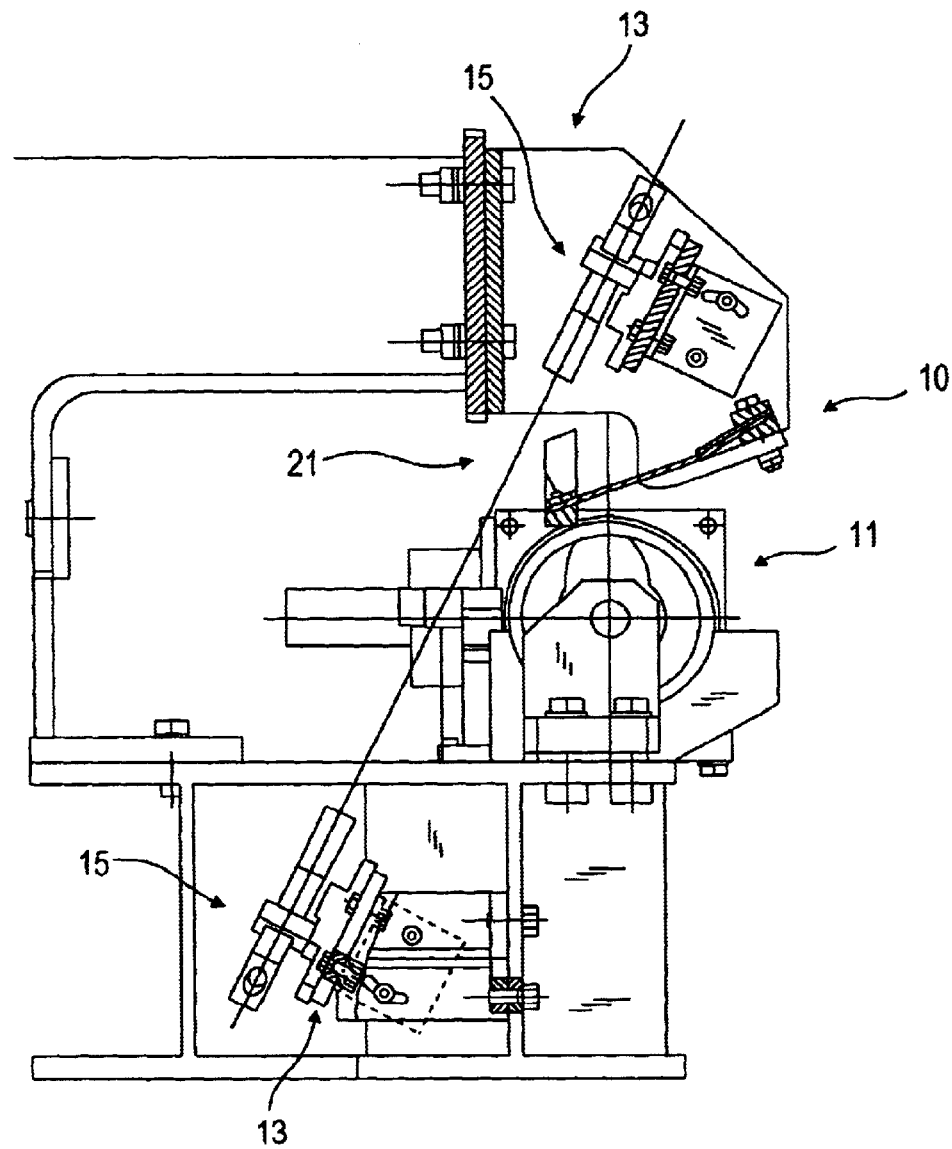
FIG. 1B represents a schematic front view of a machine which incorporates the device according to the invention.
Figure 2:
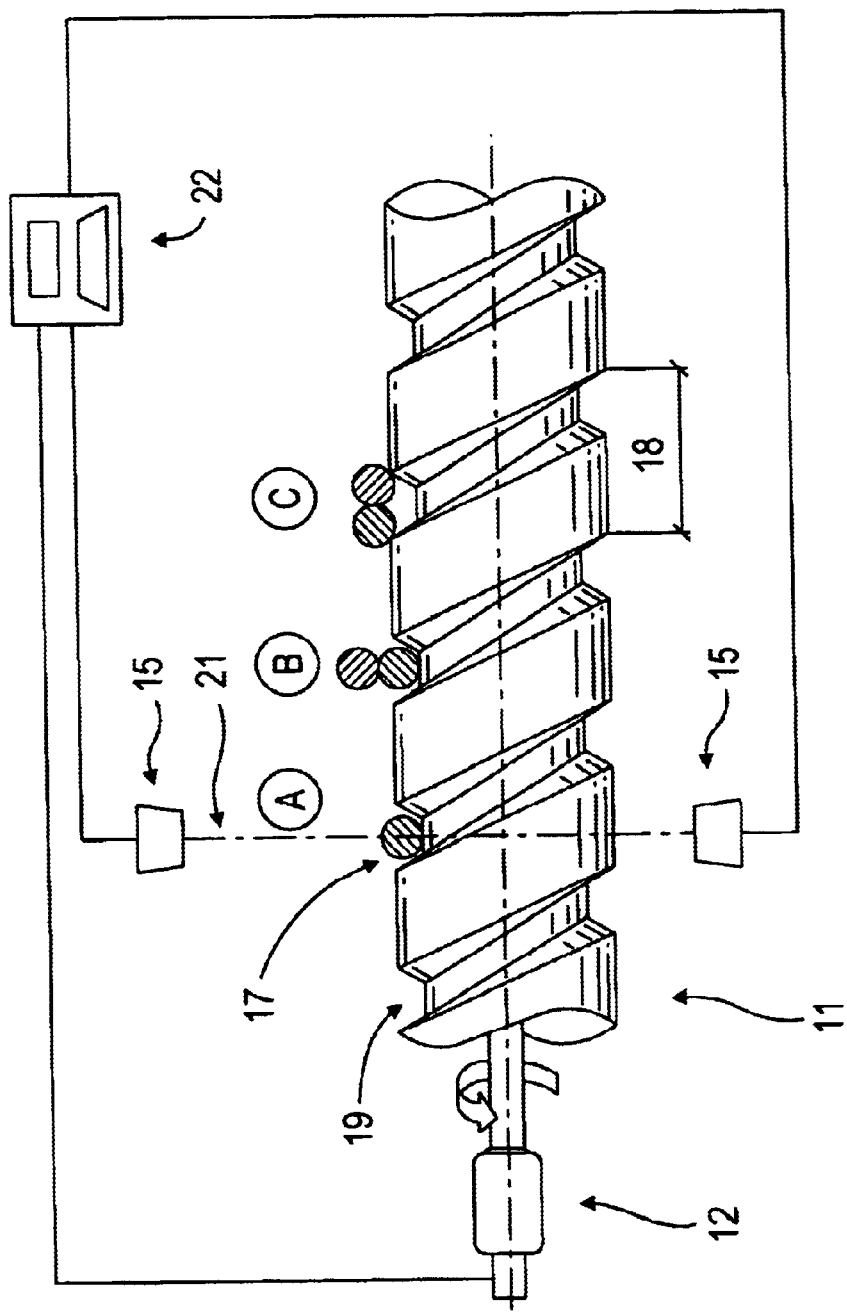
FIG. 2 represents a schematic side view of a generic worm screw according to the state of the art, with various possibilities of positioning the bars.

With reference initially to FIGS. 1A, 1B and 2, a machine (10) for counting bars incorporating the device according to the present invention comprises a worm screw. (11) with variable normal pitch (18), the screw being driven by a motor (12), equipped with means for detecting its rounds number. The counting means comprise a photocell system (15) mounted on supports (13).

The bars (17) are carried towards the head of the worm screw (11) by any type of conveyor (not illustrated) designed to translate said bars in a direction orthogonal to the axis of the bars themselves and roughly perpendicular to the axis of the worm screw. Once they have reached the head of the worm screw (11), the bars (17) are separated from one another and placed theoretically one in each groove (19) of the screw, in this way being set apart according to a space equivalent to the pitch of the screw, and hence set a suitable distance apart from one another for the subsequent count In practice, however, it is possible to define three general positions of the bars within the grooves, these positions being schematically illustrated in FIG. 2; namely, position A, in which a single bar (17) is set in the groove (19), position B, in which two bars are set, one on top of the other, in the groove, and position C, in which two bars are set in the groove, their axes lying on a plane parallel to the longitudinal axis of the screw (11).

As mentioned previously, the counting system (15), for example a photoelectric system with interruption of ray, associated to a system for detecting the number of rounds (not shown), sends its own reading to a processing unit (22) which stores information on the diameters of the bars and on the pitch of the worm screw of the screw conveyor used. By correlating the values for the diameters of the bars (17) to the number of rounds and to the pitch of the worm screw (11), the processing unit calculates the time of obscuration corresponding to the passage of a bar (17). In the case of position A, evidently the period of obscuration of the ray is substantially unique and corresponds to the diameter of the bar being measured. In case C, or similar cases—in which the lying plane of the bars is not parallel to the axis of detection (21)—the period of obscuration of the ray corresponds to two diameters of the bars being measured, or, anyway, is substantially greater than the period corresponding to a single bar. Finally, in case B, the period of obscuration of the ray substantially corresponds to the period for a single bar, or is marginally greater than this. It follows that the system, if appropriately instructed, is able to count the bars correctly in cases A and C, whereas in case B instead of two bars it counts just one.

Figure 3A:
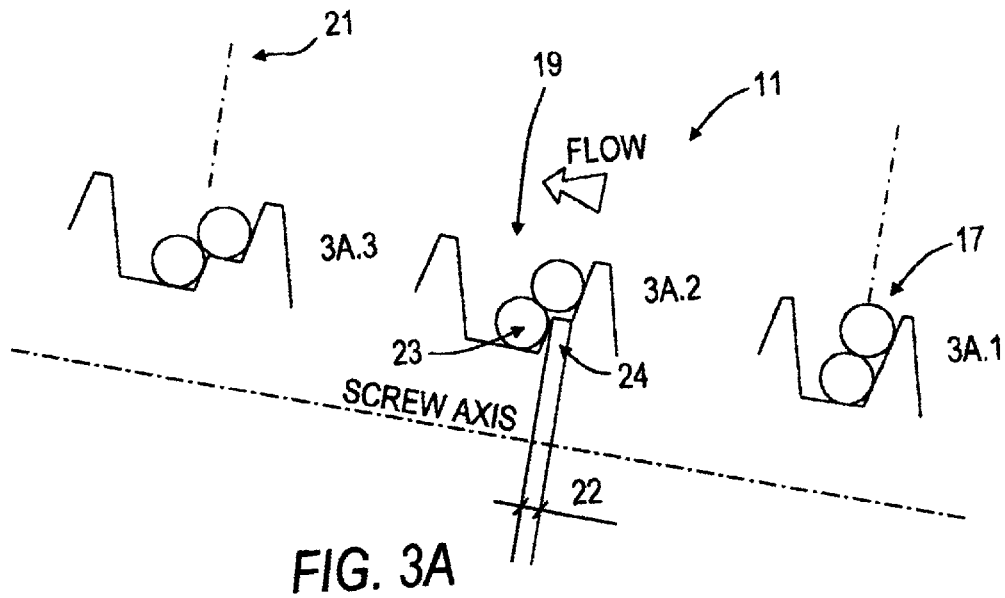
FIG. 3A represents a diagram of one possible solution for the profiles of the said grooves of the invention.

FIG. 3A illustrates a first example of embodiment of the invention wherein the worm screw, at the bars loading place presents a somewhat narrow profile as shown in FIG. 3A point 1 and when it reaches the counting position presents a somewhat wider profile, as illustrated in FIG. 3A point 3; i.e., the thread of the worm screw has a variable pitch.

Towards the bottom of the groove (19) there is a step (24), having a width (22) increasing in the direction of advance of the bars (17), as represented in FIGS. 3A, point 2 and 3A, point 3.

Figure 3B:
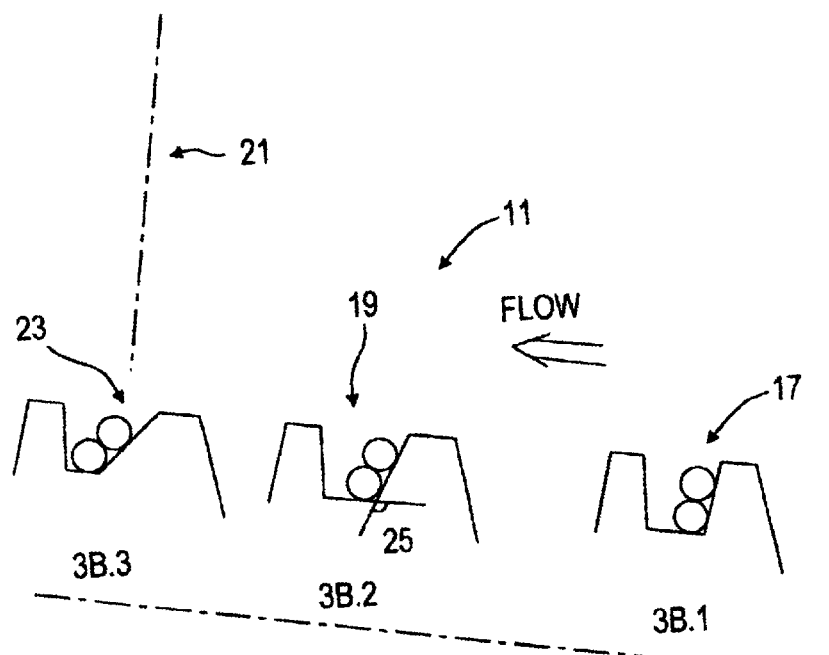
FIG. 3B represents a diagram of another possible solution for the profiles of the said grooves.
Figure 4:
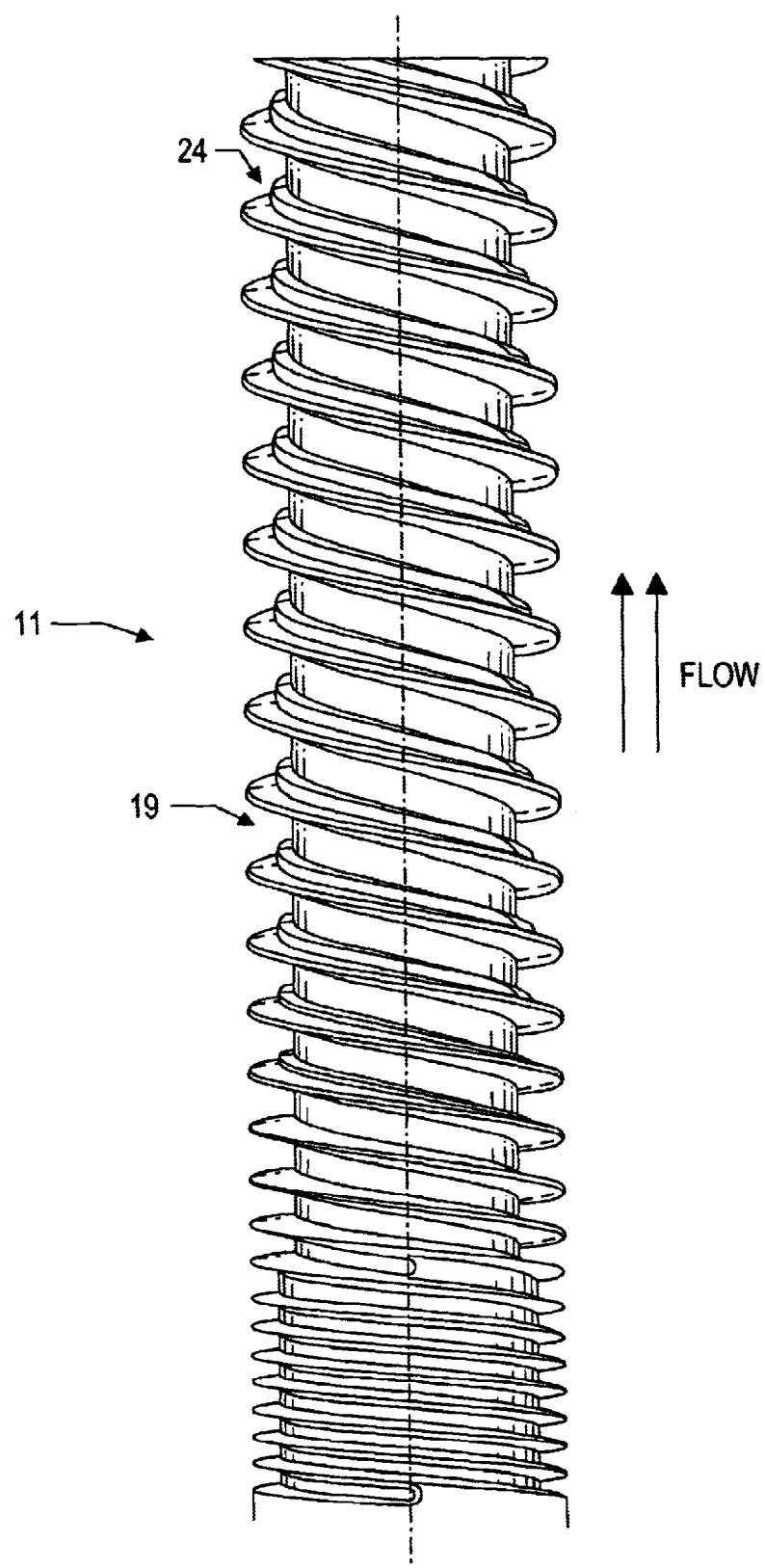
FIG. 4 represents a screw made according to the diagram of FIG. 3A.

FIG. 3B illustrates a second example of embodiment of the invention in which a wall (23) of the groove (19) of the screw (11) has a rectilinear profile which forms an angle (25), with respect to the bottom of the groove, the said angle increasing in the direction of advance of the bars, as represented in FIGS. 3B, point 1 to 3B, point 3.

In both cases, the bars are allowed to modify their mutual positions, from being set practically one on top of the other (FIGS. 3A, point 1 and 3B, point 1) to practically lying side by side (FIGS. 3A, point 3 and 3B, point 3), thus enabling them to be counted precisely.

In the case of a step being used, it should have preferably, in the vicinity of the counting means (15), a width (22) at least 0.3 times the diameter of the bar being measured. If, instead, a wall of the groove having a variable inclination is used, the angle (25) between the wall and the bottom of the groove should have preferably a value of at least 110° in the vicinity of the counting means.

What is claimed is:

1. Device for counting bars (10) that are being translated, in which the displacement of the bars towards and through the counting station is obtained by a worm-screw mechanism (11) which displaces the bars in a direction perpendicular to the axes of the bars themselves, said worm-screw being provided with a helical thread which defines, in any given plane passing through the longitudinal axis of the screw itself, a plurality of grooves or grooves (19) throughout the length of the screw, each of the said grooves accommodating at least one bar (17) being moved from one loading station to counting means (15) having a measuring axis (21), and in which the screw has a variable normal pitch (18) which increases in at least one portion of its length, wherein the said screw (11) presents, for at least part of its length, grooves (19) having at least part of a wall (23) with variable pitch increasing more rapidly than the normal pitch (18), the said increase in pitch being obtained by providing one of the walls (23) of each groove with means designed to force the position of the bars that may be present in a given groove into a plane that is substantially not parallel to the specific axis (21) of said counting means (15).

2. Device according to claim 1, in which said means designed to force the position of the bars are represented by a step (24) of width (22) increasing in the advancing direction of the bars.

3. Device according to claim 2, in which the width (22) of the step (24) is at least 0.3 times the diameter of the bars in the vicinity of the counting means (15).

4. Device according to claim 1, in which the said means designed to force the position of the bars are represented by a profile of the wall (23) of each groove which is roughly rectilinear and forms an angle (25), with respect to the bottom of the groove itself, that is increasing in the direction of advance of the bars.

5. Device according to claim 4, in which the said angle (25) is at least 110° in the vicinity of the counting means (15).

6. Device according to claim 1, in which the said worm screw has one starting point.

7. Device according to claim 1, in which the said worm screw has one or more starting points.

* * * * *